US012718700B2

(12) United States Patent
Sherback et al.

(10) Patent No.: US 12,718,700 B2
(45) **Date of Patent: *Aug. 25, 2026**

(54) CROSS-CHECKING LOCALIZATION DURING AIRCRAFT TERMINAL OPERATIONS

(71) Applicant: Reliable Robotics Corporation, Mountain View, CA (US)

(72) Inventors: Michael Andrew Sherback, Mountain View, CA (US); Robert W. Rose, Los Altos, CA (US); Matthew T. Nehrenz, San Jose, CA (US); John P. Couluris, Mountain View, CA (US)

(73) Assignee: Reliable Robotics Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/429,947

(22) Filed: Feb. 1, 2024

(65) Prior Publication Data

US 2024/0321124 A1 Sep. 26, 2024

Related U.S. Application Data

(63) Continuation of application No. 16/830,008, filed on Mar. 25, 2020, now Pat. No. 11,928,976.

(Continued)

(51) Int. Cl.

*G08G 5/54* (2025.01)
*B64D 47/08* (2006.01)

(Continued)

(52) U.S. Cl.

CPC ............... *G08G 5/54* (2025.01); *B64D 47/08* (2013.01); *B64U 20/87* (2023.01); *G01C 5/005* (2013.01);

(Continued)

(58) Field of Classification Search

CPC ...................................................... G08G 5/025

See application file for complete search history.

(56) References Cited

U.S. PATENT DOCUMENTS 5,714,948 A 2/1998 Farmakis et al.
7,212,917 B2 5/2007 Wilson (Continued)

FOREIGN PATENT DOCUMENTS

EP 3483066 A1 * 5/2019 ........... B64C 39/024
EP 3879511 A1 9/2021

(Continued)

OTHER PUBLICATIONS

English translation of Korean 102045362 B1.*

(Continued)

*Primary Examiner* — Jean Paul Cass
(74) *Attorney, Agent, or Firm* — Fenwick & West LLP

(57) ABSTRACT

A system having components coupled to an aircraft in operation processes sensor-derived data, performs a localization cross-checking procedure, and dynamically generates updated analyses of the position and orientation of the aircraft. Based on the updated analyses, the system can generate instructions for flight control of the aircraft and can update flight control instructions as new data is received and processed. The system functions to reduce the “worst-case” bounds on a localization estimate for the aircraft to a low enough level that is appropriate for completing a flight operation.

20 Claims, 10 Drawing Sheets

Related U.S. Application Data

(60) Provisional application No. 62/824,945, filed on Mar. 27, 2019.

(51) Int. Cl.

| | |
|---|---|
| ***B64U 20/87*** | (2023.01) |
| ***G01C 5/00*** | (2006.01) |
| ***G07C 5/08*** | (2006.01) |
| ***G08G 5/21*** | (2025.01) |
| ***G08G 5/26*** | (2025.01) |
| ***H04L 9/08*** | (2006.01) |

(52) U.S. Cl.

CPC ............. *G07C 5/0808* (2013.01); *G08G 5/21* (2025.01); *G08G 5/26* (2025.01); *H04L 9/0872* (2013.01)

(56) References Cited

U.S. PATENT DOCUMENTS

| | | | | |
|---|---|---|---|---|
| 9,257,048 | B1 | 2/2016 | Offer et al. | |
| 2006/0069497 | A1 | 3/2006 | Wilson | |
| 2012/0177198 | A1 | 7/2012 | Cabos | |
| 2013/0046462 | A1 | 2/2013 | Feyereisen et al. | |
| 2013/0179011 | A1* | 7/2013 | Colby | G05D 1/105 701/16 |
| 2016/0253907 | A1* | 9/2016 | Taveira | G08G 5/57 701/3 |
| 2017/0017240 | A1* | 1/2017 | Sharma | B64U 70/93 |
| 2017/0243413 | A1 | 8/2017 | Haggerty et al. | |
| 2018/0101173 | A1 | 4/2018 | Banerjee et al. | |
| 2019/0033862 | A1 | 1/2019 | Groden et al. | |
| 2019/0064341 | A1 | 2/2019 | Bunch et al. | |
| 2019/0141390 | A1 | 5/2019 | Ko et al. | |
| 2020/0043348 | A1* | 2/2020 | Ghosh | G05D 1/101 |
| 2021/0225180 | A1* | 7/2021 | S | G06T 7/70 |
| 2022/0397915 | A1* | 12/2022 | Ortman | G08G 5/74 |

FOREIGN PATENT DOCUMENTS

| | | | |
|---|---|---|---|
| JP | 2018522233 | A | 8/2018 |
| KR | 102045362 | B1 * | 12/2017 |
| RU | 2278801 | C1 * | 6/2006 |

OTHER PUBLICATIONS

English translation of EP3483066A1 to BOENIG and STERLING (Year: 2017).*

Mullins, Dynamic Separation Thresholds for a Small Airborne Sense and Avoid System Guidance, AIAA Infotech@Aerospace (I@A) Conference Navigation, and Control and Co-located Conferences Aug. 19-22, 2013, Boston, MA.*

Denys, P. et al. "Transponder altimetry: Precise height measurements over land," *Journal of Geophysical Research: Solid Earth*, vol. 100, No. B12, Dec. 10, 1995, 13 pages.

Haissig, C.M. et al. "Using TCAS surveillance to enable legacy ADS-B transponder use for in-trail procedures," *IEEE/AIAA 31st Digital Avionics Systems Conference*, Oct. 14, 2012, 14 pages.

PCT International Search Report and Written Opinion, PCT Application No. PCT/US20/25053, Jun. 23, 2020, 11 pages.

United States Office Action, U.S. Appl. No. 16/830,008, filed Jul. 5, 2023, 100 pages.

United States Office Action, U.S. Appl. No. 16/830,008, filed Feb. 9, 2023, 98 pages.

United States Office Action, U.S. Appl. No. 16/830,008, filed Nov. 1, 2022, 63 pages.

United States Office Action, U.S. Appl. No. 16/830,008, filed May 23, 2022, 44 pages.

* cited by examiner

CROSS-CHECKING LOCALIZATION DURING AIRCRAFT TERMINAL OPERATIONS

CROSS-REFERENCE TO RELATED APPLICATIONS

This application is a continuation of U.S. patent application Ser. No. 16/830,008 filed on Mar. 25, 2020, which claims the benefit of U.S. Patent Application No. 62/824,945, filed Mar. 27, 2019, each of which is hereby incorporated by reference in its entirety.

BACKGROUND

This disclosure relates generally to aircraft localization, and more specifically to cross-checking localization accuracy and/or improving "worst-case" bounds (described in more detail below) during aircraft operations (e.g., landings, takeoffs).

The terminal phases of aircraft operation are critical, and successful takeoff, landing, and other phases of flight require that the position and orientation of an aircraft with respect to a landing/takeoff site (e.g., runway) be known to a high degree of certainty. Current systems for navigation (e.g., navigation to an airport, navigation in the vicinity of an airport) require installation and maintenance of expensive apparatus, lack the precision required for automated flight procedures, are not reliable to a high enough degree, and/or are prone to interference. The inventions described herein relate to improved systems and methods for cross-checking localization information and can be used for executing automated aircraft flight operations (e.g., landing at a desired landing site, takeoff guidance, etc.).

SUMMARY

While an aircraft is in operation, a system having components coupled to the aircraft and components remote from the aircraft processes sensor-derived data, transmits information between aircraft system components and remote system components, performs a localization cross-checking procedure, and dynamically generates updated analyses of the position and orientation of the aircraft. Based on the updated analyses, the system can generate instructions for flight control of the aircraft associated with the phase(s) of flight of the aircraft and can update flight control instructions as new data is received and processed.

The system functions to reduce the "worst-case" bounds on a localization estimate for the aircraft to a low enough level that is appropriate for completing a flight operation (e.g., landing, takeoff, etc.). In particular, "worst-case" bounds are described in terms of integrity bounds, protection levels, and other relevant measures. The system can also function to increase accuracy of localization estimates in addition to reducing any "worst-case" bounds.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

1. System for Localization

Figure 1A:
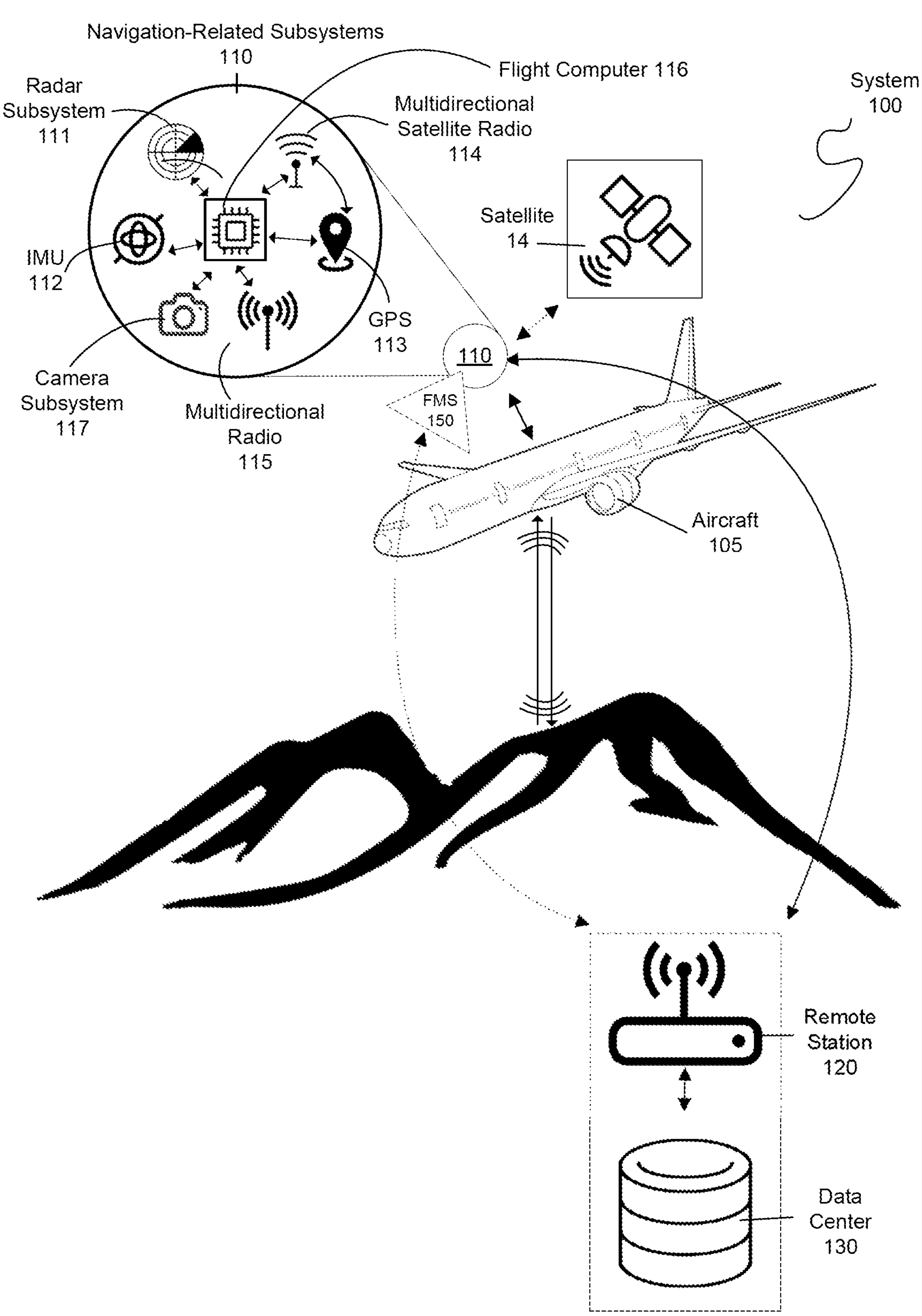
FIG. 1A is a schematic of a system for localization, in accordance with one or more embodiments.

FIG. 1A depicts a schematic of a system 100 for localization (e.g., in relation to a landing site and/or takeoff site, in relation to other phases of flight), in accordance with one or more embodiments. The system 100 can include one or more subsystems 110 for localization and/or navigation that are coupled to (e.g., mounted to, onboard, within, etc.) an aircraft 105, where the subsystems are described in more detail below. The system 100 can also optionally include a remote station 120 in communication with a data center 130 at a location remote from the aircraft 105, such that some computing functions can be performed at a location remote from the aircraft 105. The system 100 can also include a flight management system (FMS) 150 including interfaces between the remote station 120 to the FMS 150 and/or interfaces between the subsystems 110 and the FMS 150. The system 100 provides structures, subsystem interfaces, and operation modes useful for implementation of automated flight operations, including operations associated with methods described in more detail in Section 2 below.

The system 100 functions to cross-check localization estimates (e.g., in terms of "worst-case" bounds, in terms of accuracy, etc.) during flight operations (e.g., takeoff operations, landing operations, other flight operations), across multiple subsystems (e.g., GPS-associated subsystems) associated with an aircraft 105. Improved localization assessments, especially during terminal flight operations, can improve decision making (e.g., automated decision making, guidance provided to a human flight operator, instructions provided to subsystems for automating flight control of the aircraft, etc.). The system can exploit pre-existing passive structures or custom-designed passive structures (e.g., passive ground structures associated with a landing or takeoff site), active structures (e.g., active ground structures associated with a landing or takeoff site), transponder infrastructure, radar-associated signals, and/or other signal sources in performing cross-checking procedures. In some embodiments, the system 100 can also correct for drift in accuracy of localization subsystems and/or allows localization subsystems to operate continuously when one or more subsystems of the navigation subsystems are unavailable. In some embodiments, the system 100 can also perform automated flight operations based on improved localization accuracy resulting from cross-checking procedures. In some embodiments, and in relation to improved operation, the system 100 improves "worst-case" bounds (e.g., protection levels) of a localization assessment, and has no impact on the accuracy or localization assessment source.

1.1 System—Aircraft

The aircraft 105 shown in FIG. 1A is a fixed-wing aircraft. The aircraft has flight control surfaces for aerodynamically affecting flight of the aircraft relative to a pitch axis (i.e., a transverse axis), a yaw axis (i.e., a vertical axis), and a roll axis (i.e., longitudinal axis) of the aircraft. Flight control surfaces can include one or more of: ailerons, flaps, elevators, stabilizers (e.g., horizontal stabilizers), rudders, spoilers, slats, air brakes, vortex generators, trim surfaces, and any other suitable control surfaces. The aircraft also has a power plant for generation of mechanical power associated with flight operations, and in variations, the power plant can include one or more of: a piston engine (e.g., in-line engine, V-type engine, opposed engine, radial engine, etc.), a gas turbine engine (e.g., turbojet engine, turbofan engine), a pulse jet, a rocket, a Wankel engine, a Diesel engine, an electric engine, a hybrid engine, and any other suitable power plant system. The power plant is coupled to an energy source (e.g., fuel system, battery, solar cell, etc.) and a cooling system (e.g., forced convection cooling system, liquid cooling system, oil cooling system, etc.) for aircraft performance in flight.

While this description uses a fixed-wing aircraft as an example, the principles described herein are equally applicable to variations of the aircraft 105 including form factors and/or control surfaces associated with one or more of: rotorcraft, gliders, lighter-than-air aircraft (e.g., airships, balloons), powered-lift aircraft, powered-parachute aircraft, weight-shift-control aircraft, rockets, and/or any other suitable types of aircraft. Still other variations of the system 100 can involve terrestrial vehicles, water vehicles, amphibious vehicles, or other non-aircraft vehicles.

1.2 System—Subsystems for Localization, Navigation, and/or State Detection

The subsystems 110 include subsystems capable of generating data associated with dynamic states of the aircraft, environments about the aircraft, operation states of aircraft systems (e.g., power plant systems, energy systems, electrical systems, etc.), and any other suitable systems associated with operations of the aircraft on the ground or in flight. The subsystems 110 also include subsystems capable of transmitting data to and from the aircraft 105 and other remote systems.

As such, the subsystems 110 include components that generate and receive information generated from subsystems coupled to the aircraft 105, as well as a flight computer 116 providing computational infrastructure (e.g., processing components, communication buses, memory, etc.) for communicating data between the subsystems. The flight computer 116 thus provides architecture for communication of data generated by subsystems, for communication with other systems remote from the aircraft 105, for control of subsystems, and/or for control of the aircraft. The flight computer 116 can also include architecture for reporting navigation-associated information to an operator (e.g., pilot) of the aircraft 105, for instance, in manual operation modes or semi-manual operation modes where navigation states can be displayed to the operator (e.g., through an electronic flight instrument system). The subsystems 110 can thus include specialized computer components designed for use in an aircraft, and in particular, can include components that are customized in configuration relative to each other and customized in relation to processing of signals received and processed to perform aspects of the methods described in Section 2 below.

Information routed between the subsystems 110 and other systems remote from the aircraft 105 can optionally be routed through a flight management system (FMS) 150, configured for automation of flight tasks in relation to a flight plan. The FMS 150 processes navigation database information (e.g., information associated with waypoints, airways, navigation aids, airports, runways, departure procedures, arrival procedures, holding patterns, etc.), aircraft subsystem statuses, and outputs of other subsystems (e.g., radar subsystems, sensor subsystems) and determines one or more desired flight paths based on the information. The FMS can cooperate with the flight computer 116 in receiving outputs of other subsystems of the subsystems 110 and/or transmitting control instructions to affect operational states of other components of the subsystems 110. The FMS 150 can also include or interface with other control systems (e.g., of an autopilot) to transform calculated flight information into instructions for control of control surfaces of the aircraft 105 including one or more of: ailerons, flaps, elevators, stabilizers (e.g., horizontal stabilizers), rudders, spoilers, slats, air brakes, vortex generators, trim surfaces, and any other suitable control surfaces.

1.2.1 System—Radar Subsystem

As shown in FIG. 1A, the subsystems 110 include a radar subsystem 111 mounted to the aircraft, where the radar subsystem 111 includes radar transmit and receive antennas configured to enable detection of features of objects associated with a flight path of the aircraft. Radar transmit antennas of the radar subsystem 111 emit in the radio portion of the electromagnetic spectrum. Radar transmit antennas can further transmit signals that have a wavelength, gain, carrier, pulse width, pulse repetition frequency, staggering, and any other suitable characteristic suitable for generation of return signals that can be processed to determine features of objects interacting with the transmitted signals. Radar receive antennas of the radar subsystem 111 receive in the radio portion of the electromagnetic spectrum and receive signals that have an effective aperture and gain. Radar receive antennas can be coupled with elements (e.g., filters, polarizers, etc.) configured to prevent or otherwise mitigate undesired return signals associated with clutter, interference, noise, and/or jamming. Radar receive antennas can additionally or alternatively be coupled with elements (e.g., attenuators) configured to prevent saturation of the receive elements from a return signal. Radar transmit and/or receive components can, however, be coupled to any other suitable elements (e.g., waveguides, duplexers, etc.) that refine aspects of the emitted and/or received signals in a desired manner. Furthermore, radar antennas can include phased array configurations (e.g., passive phased array configurations, active phased array configurations, conformal phased array configurations, etc.) or other suitable antenna configurations.

The radar subsystem 111 can have one or more radar antennas structurally mounted to the aircraft and positioned so as to transmit signals away from a ventral surface of the aircraft 105 and/or receive signals transmitted or reflected toward the ventral surface of the aircraft. As such, radar antennas can be configured to receive signals from terrain and/or other objects below the aircraft during flight. Antennas of the radar subsystem 111 can alternatively be positioned relative to the aircraft in any other suitable manner (e.g., coupled to a non-ventral surface) in order to receive signals that can be processed to determine locations of the aircraft in flight.

Multiple radar antennas can be used for system redundancy (e.g., in the event a subset of antennas are compromised). Multiple radar antennas can also be used for providing different positions from which to emit radar signals toward objects of interest and/or for receiving radar signals from objects of interest, depending upon orientation of the aircraft 105 or characteristics of objects from which return signals are generated.

The antenna(s) of the radar subsystem 111 can be coupled to an exterior portion of the aircraft 105. One or more antenna(s) of the radar subsystem 111 can alternatively be coupled to an interior portion of the aircraft 105 and extend through a wall of the aircraft 105 to transmit and/or receive signals outside of the aircraft 105. Mounting positions are associated with desired directionality in relation to transmitted radar signals and/or received signals, in relation to relative orientations between the aircraft and objects used to determine the location(s) of the aircraft 105 during flight. The antenna(s) of the radar subsystem 111 can thus be fixed in position. The antenna(s) of the radar subsystem 111 can alternatively be adjustable in position and/or rotation based on orientations of the aircraft in flight. The radar subsystem 111 can thus include actuators coupled to the antenna(s) of the antenna subsystem 111 and/or position encoders coupled to the actuators, in relation to electronic control of antenna positions.

The radar subsystem 111 produces output signals that have a characteristic resolution and power, and from which transmit time-related parameters (e.g., time between transmission of a signal and receipt of a return signal), distance-related parameters (e.g., distance between the aircraft and an object in relation to altimeter functions, other distance-related functions, etc.), reflector object parameters (e.g., shape, surface features, etc.), scattering parameters, frequency modulation parameters, speed-related parameters (e.g., change in distance between the aircraft and an object), and/or any other suitable parameters can be extracted to determine a location of the aircraft during flight.

Furthermore, while images are described, the radar subsystem 111 can be supplemented with or otherwise replaced with a light detection and ranging (LIDAR) subsystem that includes light emission elements and/or light sensors for receipt of optical signals indicative of features about the aircraft (e.g., in relation to light reflective objects, light scattering objects, light absorbing objects, light responsive objects, etc.), where the optical signals can be processed to determine locations of the aircraft 105 during flight, in relation to the method(s) described in Section 2 below. As such, the system 100 can implement other sensors that provide height information related to positions of the aircraft 105, in order to augment navigation of the aircraft 105 in space.

1.2.2 System—Camera Components

As shown in FIG. 1A, the subsystems 110 include a camera subsystem 117 mounted to the aircraft, where the camera subsystem 117 includes sensors configured to capture features of the environment (e.g., takeoff environment, landing environment, flight environment, etc.) of the aircraft 105, features of objects in the vicinity of the environment of the aircraft, features of calibration objects along a path of operation of the aircraft, features of other objects along a path of operation of the aircraft, and/or any other suitable object aspects to facilitate automated landing of the aircraft at a desired landing site.

Sensors of the camera subsystem 117 can utilize the visible spectrum. Sensors of the camera subsystem 117 can additionally or alternatively include longwave infrared (LWIR) sensors (e.g., sensors operating in the 8-12 μm band). The camera subsystem 117 can also include optical elements (e.g., lenses, filters, mirrors, apertures etc.) for manipulating light reaching the sensors of the camera subsystem 117. In relation to detection of airport lighting systems for landing site localization relative to airport lighting, the camera subsystem 117 can include one or more filters optically coupled to the sensors and configured to detect spectra of light emitted from airfield landing systems (e.g., lighting systems in accordance with Federal Aviation Administration Advisory Circular 150/5345-46E). Variations of the camera subsystem 117 can, however, have any other suitable sensor types and/or optical elements associated with visible spectra and/or non-visible spectra electromagnetic radiation.

The camera subsystem 117 can have one or more cameras structurally mounted to the aircraft and positioned so as to enable detection of the landing site or other site relevant to operation of the aircraft, as the aircraft traverses through space. Multiple cameras can be used for system redundancy (e.g., in the event a subset of cameras have occluded optical elements) and/or for providing different field of view options depending on approach path and orientation to a landing site. The camera(s) of the camera subsystem 117 can be coupled to an interior portion of the aircraft 105 or can be coupled to an exterior portion of the aircraft 105. Mounting positions are associated with desired flight paths to a landing site (e.g., approach patterns, instructions from air traffic control, etc.). As such, the camera subsystem 117 can have a camera that has a field of view of at least 270 degrees about the aircraft 105. The camera subsystem 117 can additionally or alternatively have a first camera mounted toward a port side of the aircraft (e.g., for left traffic operations), a second camera mounted toward a starboard side of the aircraft (e.g., for right traffic operations), a third camera mounted toward a nose portion of the aircraft (e.g., for straight-in approaches), and/or any other suitable cameras mounted at any other suitable portion of the aircraft 105.

The camera(s) of the camera subsystem 117 can thus be fixed in position. The camera(s) of the camera subsystem 117 can alternatively be adjustable in position based on flight paths of the aircraft 105 to the landing site. The camera subsystem 117 can thus include actuators coupled to the camera(s) of the camera subsystem 111 and/or position encoders coupled to the actuators, in relation to electronic control of camera positions. In relation to image stabilization, the camera(s) of the camera subsystem 117 can be coupled to image stabilization subsystems (e.g., gimbals) to reduce artifacts due to vibration or other undesired image artifacts that would otherwise be included in image data generated from the camera subsystems 117.

The camera subsystem 117 produces output images that have a characteristic resolution (e.g., associated with a sensor size), focal length, aspect ratio, and/or directionality (e.g., unidirectionality associated with 360-degree images), format color model, depth, and/or other aspects. The camera subsystem 117 can be configured for one or more of: monoscopic images, stereoscopic images, panoramic images, and/or any other suitable type of image output. Furthermore, while images are described, the camera subsystem 117 can be configured to output video data, in relation to the method(s) described in Section 2 below.

Figure 1B:
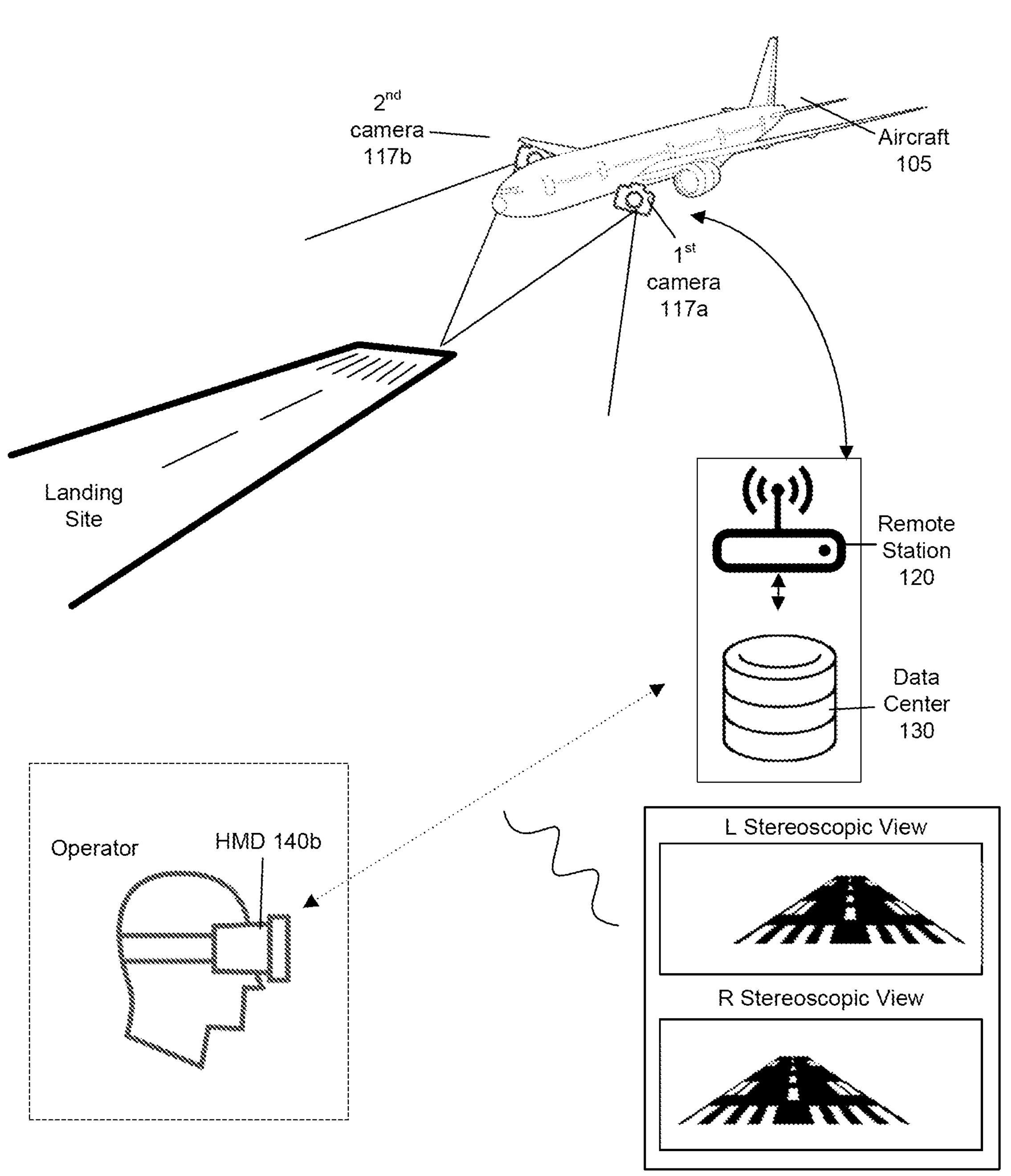
FIG. 1B is a schematic of a variation of a system for localization, in accordance with one or more embodiments.

In one variation, as shown in FIG. 1B, the camera subsystem 117 includes a first camera 117*a* mounted at a port side of the aircraft 105 and a second camera 117*b* mounted at a starboard side of the aircraft, where the first camera 117*a* and the second camera 117*b* collectively have modes for generation of stereoscopic images (e.g., left and right stereoscopic images associated with similar or identical time points of image capture). Stereoscopic images can then be transmitted to an operator wearing a head mounted display (HMD) 140*b* or otherwise interacting with a display of an operator interface for viewing stereoscopic images (e.g., in a 3D image format). Stereoscopic images can also be used by a non-human entity and/or without involvement of an HMD.

1.2.3 System—IMU Components

The subsystems 110 also include one or more inertial measurement units (IMUs) 112 for measuring and outputting data associated with the aircraft's specific force, angular rate, magnetic field surrounding the aircraft 105, and/or other position, velocity, and acceleration-associated data. Outputs of the IMU can be processed with outputs of other aircraft subsystem outputs to determine poses of the aircraft 105 relative to a landing site (or other target), and/or pose trajectories of the aircraft 105 relative to a landing site (or other target). The IMU 112 includes one or more accelerometers, one or more gyroscopes, and can include one or more magnetometers, where any or all of the accelerometer(s), gyroscope(s), and magnetometer(s) can be associated with a pitch axis, a yaw axis, and a roll axis of the aircraft 105.

The IMUs 112 are coupled to the aircraft and can be positioned internal to the aircraft or mounted to an exterior portion of the aircraft. In relation to measurement facilitation and/or post-processing of data form the IMU, the IMU can be coupled to a vibration dampener for mitigation of data artifacts from sources of vibration (e.g., engine vibration) or other undesired signal components.

1.2.5 System—GPS Components

The subsystems 110 can include a global positioning system (GPS) 113 coupled to the aircraft and including antennas tuned to frequencies transmitted by satellites for receiving location-associated and velocity-associated data of the aircraft 105. The GPS 113 has a GPS processor, a clock, and a data link (e.g., wireless data link, wired data link). The GPS 113 can include a display and can include any suitable number of channels (e.g., greater than 12 channels, less than or equal to 12 channels, etc.) for monitoring of different satellites. The GPS 113 can be electronically coupled to an electrical system of the aircraft 105 for power and/or alternatively include an independent power source (e.g., for a portable configuration). The GPS 113 can further be coupled to other subsystems 110. The GPS 113 can additionally or alternatively be coupled to the FMS 150. The GPS 113 can include one or more receiver inputs for differential corrections (e.g., using an RTCM SC-104 format) and/or can be configured as a wide area augmentation system (WAAS) receiver. Furthermore, the GPS 113 can include architecture for relaying data (e.g., location-associated data, time-associated data, velocity-associated data, etc.) to other data processing devices using a NMEA 0183 protocol or any other suitable protocol (e.g., SiRF protocol, MTK protocol, etc.).

The GPS 113 can have one or more receivers coupled to the aircraft 113 (e.g., within the aircraft, mounted to the aircraft) and positioned so as to mitigate interference from other portions of the aircraft 105 (e.g., structural features of the aircraft) and/or other subsystems associated with the aircraft 105.

In relation to the IMU 112, the GPS 113 can also be communicatively coupled to the IMU 112 as an IMU-enabled GPS. In IMU-enabled GPS configurations, the GPS 113 can thus include operation modes that output location-associated information and/or velocity-associated information when satellite signals to the GPS 113 are unavailable, based on position and velocity outputs of the IMU 112 and a reference location of the aircraft 105 from the GPS, when satellite signals to the GPS 113 were available.

In relation to the GPS 113, the subsystems 110 can also include a satellite transmission subsystem 114 including relays for interfacing with one or more satellites including satellite 14. The satellite transmission subsystem 114 can thus include channels associated with the GPS 113 described above in relation to receipt and transmission of satellite signals associated with the GPS 113. The satellite transmission subsystem 114 can additionally or alternatively include channels associated with transmission and/or reception of satellite data for traffic avoidance in coordination with automatic dependent surveillance broadcast (ADS-B) functionality, for weather services (e.g., in relation to weather along flight path, in relation to winds aloft, in relation to wind on the ground, etc.), for flight information (e.g., associated with flight restrictions, for notices, etc.), and/or for any other suitable purpose. The satellite transmission subsystem 114 operates in approved frequency bands (e.g., bands approved through Federal Communications Commission regulations, bands approved through Federal Communications Commission advisory circulars, etc.). The system 100 can additionally or alternatively implement other ground and/or space-based augmentation systems

1.2.6 System—Communication Components

The subsystems 110 also include a radio transmission subsystem 115 for communication with the aircraft 105, for transmission of aircraft identification information, or for transmission of other signals. The radio transmission subsystem 115 can include one or more multidirectional radios (e.g., bi-directional radios) onboard the aircraft, with antennas mounted to the aircraft in a manner that reduces signal transmission interference (e.g., through other structures of the aircraft). The radios of the radio transmission subsystem 115 operate in approved frequency bands (e.g., bands approved through Federal Communications Commission regulations, bands approved through Federal Communications Commission advisory circulars, etc.).

The communication-related components of the subsystems 110 can additionally or alternatively cooperate with or supplement data from other avionics components (e.g., the GPS 113), electrical components (e.g., lights), and/or sensors that support flight operations (e.g., in flight, during landing, on the ground, etc.), that support observability by other traffic, that support observability by other aircraft detection systems, that provide environmental information (e.g., pressure information, moisture information, visibility information, etc.) and/or perform other functions related to aircraft communications and observability.

1.3 System—Remote Components

As shown in FIG. 1A, the system 100 can optionally include a remote station 120 that includes devices for wirelessly receiving data from and transmitting data to subsystems coupled to (e.g., onboard, the aircraft). The remote station 120 includes one or more multidirectional radios (e.g., bi-directional radios) onboard the aircraft, with antennas mounted to the aircraft in a manner that reduces signal transmission interference (e.g., through other structures of the aircraft). The radios of the remote station operate in approved frequency bands (e.g., bands approved through Federal Communications Commission regulations, bands approved through Federal Communications Commission advisory circulars, etc.). The remote station 120 is in communication with a data center 130 for storage and retrieval of data derived from subsystems of the aircraft 105. The data center uses storage and retrieval protocols and can use data encryption protocols for promoting security in relation to handling sensitive information pertaining to autonomous flight of the aircraft 105.

The remote station 120 can also use communications technologies and/or protocols in relation to data transmission operations with the data center 130, subsystems of the aircraft 105, and/or the operator interface 140 described in more detail below. For example, the remote station 120 can have communication links using technologies such as Ethernet, 802.11, worldwide interoperability for microwave access (WiMAX), 3G, 4G, code division multiple access (CDMA), digital subscriber line (DSL), or other communication technologies. Examples of networking protocols used for communications with the remote station 120 include user datagram protocol (UDP) and/or any other suitable protocol. Data exchanged with the remote station 120 can be represented using any suitable format.

Furthermore, in relation to communications-related subsystems, if a communication does not operate as intended (e.g., a communication link fails), the aircraft 105 can be transitioned into a safety operation mode. In an example, in the safety operation mode, the aircraft 105 enters a holding pattern until operation of the communications-related subsystems are restored to proper operation, or until the aircraft 105 can be operated safely/safely landed in another manner.

1.4 System—Conclusion

Variations of elements of the system 100 described above and shown in FIGS. 1A and 1B can be configured in any other suitable manner. For instance, portions of one or more of: the flight computer 116 onboard the aircraft 105, the FMS 150, the remote station 120, and/or the data center 130 can operate as a computing system that includes machine-readable instructions in non-transitory media for implementation of an embodiment of the method 200 described below, in relation to one or more of: monitoring a status of an aircraft in operation; in response to the status satisfying a condition, initiating a localization cross-check procedure associated with one or more subsystems associated with the aircraft; generating updated analyses of a state of the aircraft (e.g., in relation to protection levels relative to a desired landing or takeoff site); generating a set of instructions for flight control of the aircraft based upon the updated analysis of the state of the aircraft (e.g., with the FMS 150, etc.); and performing any other method portion described. In relation to flight control, the system 100 can include an electronic interface between the computing system (e.g., flight computer 116, remote station 120) and an FMS 150 of the aircraft (e.g., as supported by the computing system), the electronic interface operable in a mode that transmits the set of instructions to the flight management system and controls operation of the aircraft. One or more portions of the computing system described above can further include architecture for storing a database of navigation object characteristics relevant to flight paths of the aircraft 105, where the database of navigation object characteristics can include a high-resolution height map database of terrain, static objects, infrastructure associated with moving objects, passive and/or active markers, and/or other features below or in the path of the aircraft 105 during flight. The database can be accessed by portions of the computing system to facilitate portions of the method 200 described below.

Additional aspects of the method 200 are described in further detail in Section 2 below. Further, while the system(s) described above can implement embodiments, variations, and/or examples of the method(s) 200 described below, the system(s) can additionally or alternatively implement any other suitable method(s).

2. Method for Localization Cross-Checking

Figure 2A:
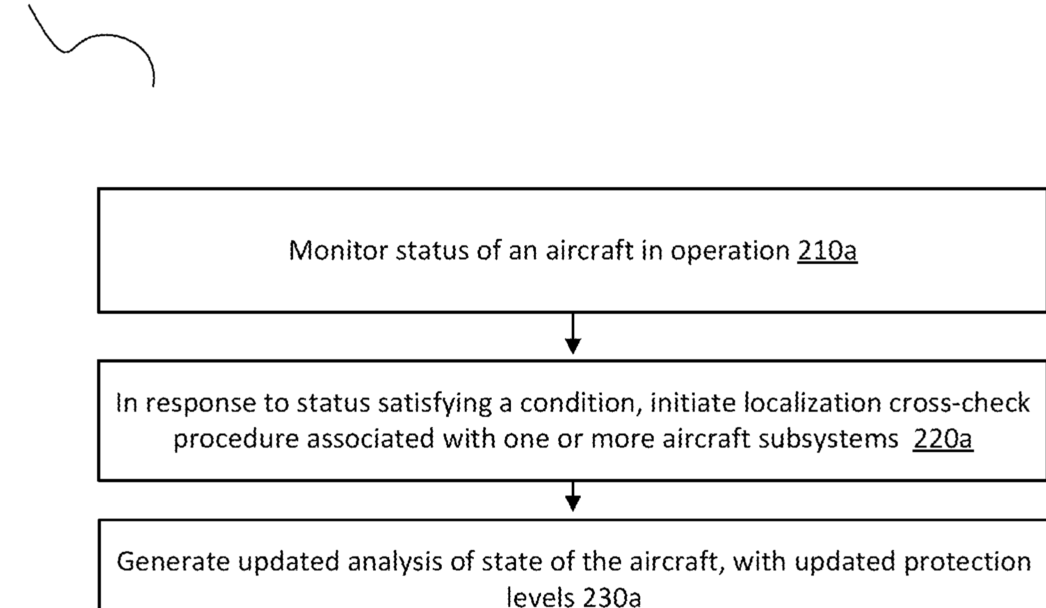
FIG. 2A depicts a flowchart of a method 200 for localization, in accordance with one or more embodiments.
Figure 2B:
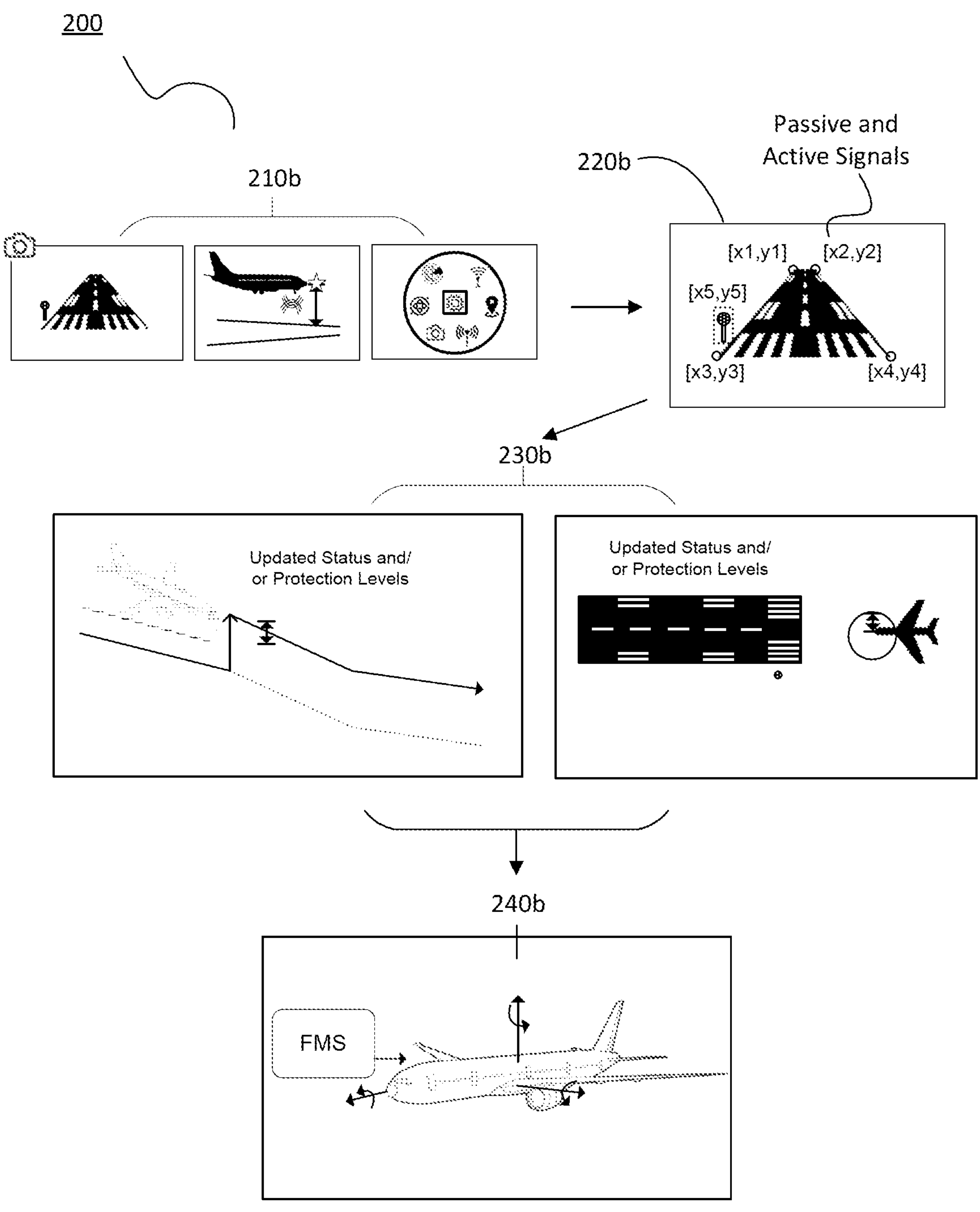
FIG. 2B depicts a schematic of a method flow according to embodiments shown in FIG. 2A.

FIG. 2A depicts a flowchart of a method 200 for localization cross-checking, in accordance with one or more embodiments. FIG. 2B depicts a schematic of a method flow according to embodiments shown in FIG. 2A. The method 200 functions to process sensor-derived data for localization of an aircraft (e.g., during terminal phases of flight), transmit information between aircraft subsystems and/or systems remote from the aircraft, and dynamically generate updated analyses of aircraft state (e.g., in relation to integrity of subsystems such as GPS subsystems, in relation to "worst-case" bounds such as protection levels relative to a desired landing or takeoff site). Based on the position and orientation information, the method 200 can also generate instructions for flight control of the aircraft toward a flight path to the landing site and can update flight control instructions as new data is received and processed.

In particular, the method 200 can also include functionality for cross-checking of localization "worst-case" bounds and/or accuracy, directly controlling operation of an aircraft during terminal operations (e.g., takeoffs, landings) and/or controlling other aircraft operations in a reliable and safe manner. The method 200 can be implemented by one or more embodiments of the system 100 described above, in relation to FIGS. 1A and 1B. In particular, portions of the method 200 can be implemented by the computing system components described above, for instance, at a portion of the computing system operating at the remote station and/or at a portion of the computing system operating at a flight computer onboard the aircraft, with communication of inputs and outputs across computing system components as defined by the architecture described above.

Embodiments of the method 200 can be used to perform spot-check verification of proper localization subsystem operation, in relation to specific phases of flight (e.g., takeoffs and landings); however, in some embodiments, the method 200 can be adapted to be used for continuous navigation functions of the aircraft. Furthermore, in relation to cross-checking operation of different subsystems of the aircraft for navigation/localization, embodiments of the method 200 can be used to provide system redundancy in the event that a subportion of the navigation/localization subsystems fail.

2.1 Method—Aircraft Status Monitoring

As shown in FIGS. 2A and 2B, Blocks 210*a* and 210*b* include functionality for monitoring a status of an aircraft in operation. In particular, in relation to system elements described above, the flight computer 116 or other portion of the computing system (e.g., remote station 120, FMS 150) receives information from one or more subsystems (e.g., of subsystems 110 described above) associated with the aircraft, and analyzes the subsystems to determine a condition of the aircraft in operation, where the condition can be used in Blocks S220*a* and S220*b* to determine if a localization cross-checking procedure should be performed. In embodiments, the information can include one or more of: altitude information, position information, orientation information, velocity information, information regarding operation states of subsystems of the aircraft (e.g., states of aircraft powerplant operation, states of aircraft lighting system operation, states of aircraft control surfaces operation, states of aircraft navigation system operation, etc.), and information from other suitable information source(s). In some specific examples, triggering conditions for initiating a cross-check procedure can include detection of one or more of: phases of an approach path to a landing site (e.g., position on short final, approach sequencing relative to other aircraft, takeoff clearance and/or sequencing relative to other aircraft, etc.), status of aircraft in flight (e.g., relative to WAAS minimums), and status of aircraft subsystems (e.g., integrity/failure states of aircraft subsystems).

Additional examples of altitude and position monitoring for initiating localization cross-checking procedures are described below.

2.1.1 Aircraft Status Monitoring—Altitude Monitoring Example

In embodiments, an altitude status of the aircraft can be monitored in relation to initiating a localization cross-checking procedure, whereby altitude measurements from an altitude sensor of an altimeter of the aircraft are received and processed. The flight computer 116 or other portion of the computing system (e.g., remote station 120, FMS 150) can then perform an altitude status monitoring operation by processing the received altitude measurements and comparing the received altitude measurements to a threshold condition to determine if localization cross-checking should be performed. The threshold condition can be a threshold altitude of a set distance relative to a landing or takeoff site, a threshold altitude relative to another reference point (e.g., ground level), a threshold altitude associated with computational ability to distinguish relevant features from information received from different subsystems, a threshold altitude associated with interference from other environmental aspects (e.g., moisture in the air, particulate matter in the air, etc.), and/or any other suitable threshold altitude condition. Outputs of the altitude status monitoring process include computer-readable objects indicative of satisfaction of the threshold altitude condition by the measured altitude of the aircraft. However, in some embodiments, the flight computer 116 or other portion of the computing system can omit initiating a localization cross-checking procedure based upon altitude threshold conditions.

2.1.2 Aircraft Status Monitoring—Proximity Monitoring Example

Figure 2C:
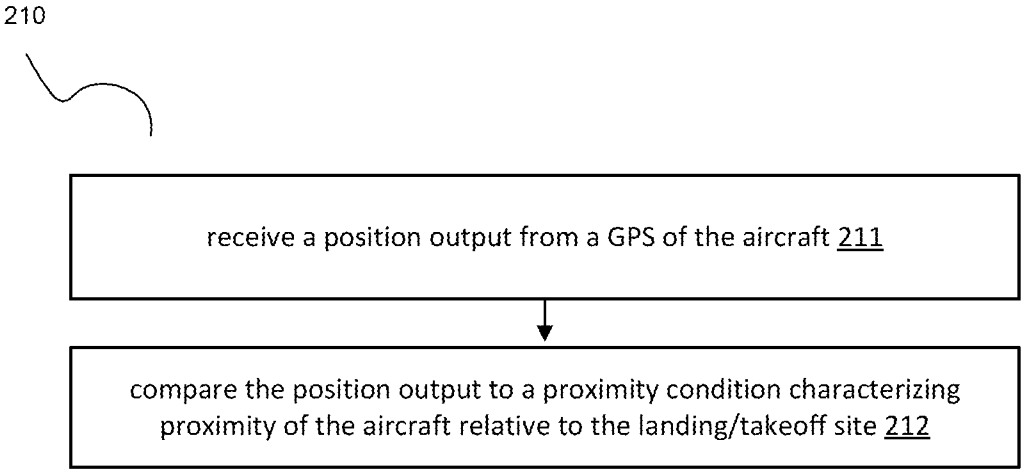
FIG. 2C depicts a flowchart of a portion of a method for localization, in accordance with one or more embodiments.

Additionally, or alternatively, in embodiments, a proximity status of the aircraft can be monitored in relation to initiating a localization cross-checking procedure, where the proximity status captures a level of proximity of an aircraft relative to a takeoff or landing site. In one such embodiment, as shown in FIG. 2C, the computing system receives 211 a position output from a global positioning system (GPS) of the aircraft. The position output can be derived from transmissions between a satellite and a GPS onboard the aircraft and describe a geographic distance between the aircraft and the landing site. In an example of Block 211, the computing system (e.g., navigation subsystems of the system) can monitor the geographic location of the aircraft in near real time, calculate the distance between the geographic location of the aircraft and the geographic location of the landing/takeoff site, and transmit the distance to the computing system of Block 211 as the position output. In variations, the computing system can receive 211 position outputs derived from other distance measuring apparatus, such as a transponder-based distance measuring equipment (DME), a non-directional beacon (NDB), a lateral navigation (LNAV) system, a vertical navigation (VNAV) system, or an area navigation (RNAV) system. Additionally, or alternatively, in still other variations, a position output can be determined from dead reckoning using other sensors (e.g., IMU components, etc.), which can be beneficial in GPS-unavailable or GPS-denied scenarios. As such, the computing system can receive position outputs in terms of geographic distances, line-of-sight-distances, or in any other suitable format.

The landing/takeoff site can be a paved runway (e.g., a runway in Class B airspace, a runway in Class C airspace, a runway in Class D airspace, a runway in other airspace), a landing strip (e.g., paved, grass, dirt), a water landing site, a landing site on snow, a landing/takeoff site on sand, or any other landing/takeoff site associated with an approach pattern and/or glide slope. The landing site can alternatively be a landing site associated with vertical takeoff and landing (VTOL) operations, such as those used by a helicopter or distributed electric propulsion (DEP) aircraft. The landing site can also have lighting systems and/or markings (e.g., passive structures, active structures, etc.) described in more detail below in Section 2.2.

As shown in FIG. 2C, in Block 212, the computing system compares the position output to a proximity condition characterizing proximity of the aircraft to the landing site. The proximity condition is a threshold condition describing how close the aircraft is to the landing site (e.g., in terms of geographic distance, in terms of line-of-site distance, etc.). As such, a distance extracted from the position output is compared to a threshold distance. In examples, the proximity condition can be associated with a threshold distance of 15 miles from the landing site, 10 miles from the landing site, 5 miles from the landing site, or any other distance from the landing site. In examples, the proximity condition can be associated with a threshold distance from a takeoff site (e.g., distance on a taxiway relative to a hold-short position for a desired runway, position on a taxiway based on instructions from ground control, etc.). The threshold condition can additionally or alternatively be associated with entrance into airspace associated with the landing site, arrival at a position (e.g., 45-degree entry position, crosswind position, downwind position, base position, final position, etc.) associated with an approach path to the landing site. The threshold condition can additionally or alternatively be dynamically modified based on a speed of operation (e.g., cruise speed, approach speed, landing speed, etc.) of the aircraft, configuration of the aircraft (e.g., in terms of flap operation, spoiler operation, landing gear operation, etc.) and/or a weather condition (e.g., associated with winds, visibility, precipitation, etc.). For instance, the threshold condition can be set to a greater distance threshold if the aircraft is moving at a faster ground speed.

However, in other embodiments, as described above, additional or alternative statuses of other aspects of the aircraft can be monitored to initiate localization cross-checking. Still alternatively, embodiments of the method can omit monitoring statuses of the aircraft in manners described above, and initiate localization cross-checking in another manner.

2.2 Method—Localization Cross-Checking Procedure

As shown in FIGS. 2A and 2B, Blocks 220*a* and 220*b* include functionality for initiating a localization cross-check procedure with one or more subsystems associated with the aircraft, based upon the status of the aircraft. In particular, in relation to system elements described above, the flight computer 116 or other portion of the computing system (e.g., remote station 120, FMS 150) receives information from one or more subsystems (e.g., of subsystems 110 described above) associated with the aircraft in relation to a monitored state of the aircraft (e.g., internal state, state relative to an environment of the aircraft), and initiates a localization cross-checking procedure if the aircraft is in a condition or state (e.g., altitude condition, proximity condition, subsystem status condition, velocity condition, etc.) warranting initiation of localization cross-checking.

In embodiments, the localization cross-check procedure functions to assess localization determination during terminal flight operations (e.g., landings, takeoffs, etc.), critical phases of flight, and/or other operations, and can be used to verify GPS subsystem integrity for assisting in guidance or automating critical phases of flight. In embodiments, the cross-check procedure can implement synthetic vision (e.g., associated with infrared, visual spectrum, or ultraviolet signals) and/or radar-associated subsystems (e.g., of subsystems 110 described above) in coordination with signals from other infrastructure (e.g., ground infrastructure, infrastructure that provides passive signals as described in more detail below, infrastructure that provides active signals as described in more detail below, etc.). In embodiments, the cross-check procedure can be used to verify GPS integrity and/or update protection levels (e.g., horizontal protection levels, vertical protection levels) in order to improve accuracy and/or provide localization integrity assurance (protection levels) necessary to carrying out a flight operation (e.g., takeoff, landing).

2.2.1 Cross-Checking Procedure Based on Passive Infrastructure and Markings In one embodiment, the flight computer 116 or other portion of the computing system (e.g., remote station 120, FMS 150) described above can receive and process signals derived from passive infrastructure, such as passive ground infrastructure located in proximity to a landing or takeoff site. In this embodiment, the flight computer 116 or other portion of the computing system can verify GPS integrity to a high degree of accuracy in comparison to current navigation aids (e.g., Wide Area Augmentation System, WAAS) and associated WAAS protection levels, by performing synthetic vision and/or radar-based analyses of information derived from passive ground structures.

The passive ground structures can provide reference objects associated with a landing site, takeoff site, or other site. Passive ground structures can include one or more of: approach lighting systems (e.g., visual approach slope indicator lights, precision approach path indicator lights, other approach lights), runway lighting systems (e.g., lights associated with runway features, lights associated with clearances, lights associated with other air traffic control instructions), taxiway lighting systems (e.g., lights associated with taxiway features, lights associated with clearances, lights associated with other air traffic control instructions, etc.), passive beacons, other airport lights, and/or other non-airport lights in the vicinity of the landing site. Airport lighting objects can be regulated objects (e.g., according to International Civil Aviation Organization regulations).

Passive ground structures can additionally or alternatively include one or more of: airport markers associated with runway markings (e.g., centerlines, hold short bars, runway numbers, displaced thresholds, blast zones, etc.), taxiway markings (e.g., centerlines, approach to hold short bars, instrument landing system position indicators, movement areas, non-movement areas, parking areas, etc.), airport signage, other airport markers, and/or other markers in the vicinity of a landing or takeoff site. Airport markers can be regulated objects (e.g., according to International Civil Aviation Organization regulations).

Passive ground structures can additionally or alternatively include one or more of: large scale landing site objects (e.g., runways, taxiways, buildings, fields, transportation infrastructure, other infrastructure, geographic terrain features, etc.), where edges, corners, or any other suitable feature of the objects can be detected and used as a reference to perform the cross-check procedure of Blocks 220*a* and 220*b*.

In examples, the flight computer 116 or other portion of the computing system can receive data associated with passive ground structures from one or more of camera subsystem 117 and/or radar subsystem 111, and estimate the position of the aircraft relative to the passive ground structures using image analysis techniques and/or processes for determining distances (e.g., line of sight distances, altitudes, etc.) from radar signals. In a specific example of using radar signals, the flight computer 116 or other portion of the computing system can perform a contour matching operation associated with terrain or other ground structures, by comparing radar altimeter data to information from pre-recorded contour maps, in order to generate a localization estimate for the aircraft (e.g., relative to a landing site or takeoff site).

In one variation of the examples described above, the computing system can process data captured by the camera subsystem 117 described above, where the data includes image data of approach light system (ALS) configurations associated with the landing/takeoff site. In a specific example, the image data can capture a configuration of medium intensity approach lighting system with runway alignment indicator lights (e.g., of a MALSR system) associated with the particular landing/takeoff site and perform the localization cross-check procedure using the image data of the MALSR. In another specific example, the image data can capture a configuration of high intensity approach lighting systems with sequenced flashing lights (e.g., of an ALSF-2 system) associated with the particular landing/ takeoff site and perform the localization cross-check procedure using the image data of the ALSF-2. In another specific example, the image data can capture a configuration of runway end identifier lights (e.g., of an REIL system) associated with the particular landing/takeoff site and perform the localization cross-check procedure using the image data of the REIL. In another specific example, the image data can capture a configuration of a custom or proprietary configuration of markings (e.g., retroreflective markings) or lights installed at the particular landing/takeoff site and perform the localization cross-check procedure using the image data of the custom or proprietary configuration.

Figure 3A:
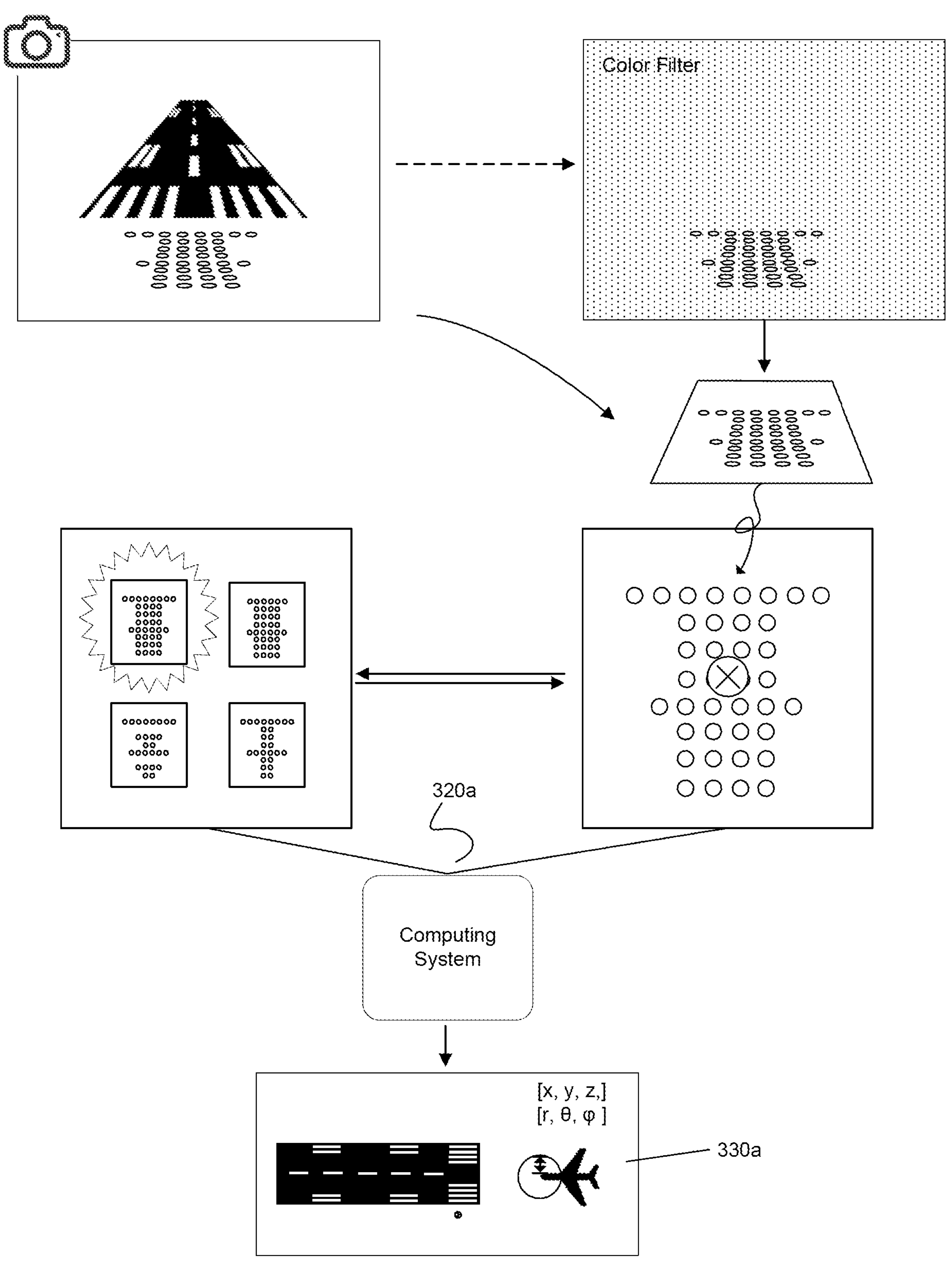
FIG. 3A depicts a schematic of a variation of a portion of the method shown in FIGS. 2A-2B.

In relation to processing image data of lighting and/or markings in proximity to a takeoff or landing site, FIG. 3A depicts a schematic of a process by which image data is processed onboard automatically by the flight computer or transmitted to a remote computing entity that automatically applies image processing operations to the image(s) to characterize one or more positions of the reference objects(s) associated with the landing/takeoff site, for generating a localization estimate for the aircraft. For each image generated by the camera subsystem (e.g., camera subsystem 117), the computing system can apply a filtering operation (optional, as shown in FIG. 3A) to the image to extract or otherwise increase the intensity of features of the reference object(s) associated with the passive infrastructure captured in the image. The filtering operation can be a color filtering operation that isolates image pixels associated with a particular color (e.g., light wavelength, paint color, signage color, etc.) of the reference object(s) to generate a color-filtered image. The filtering operation can also apply contrasting operations and/or saturation increasing operations to increase the contrast prior to or post application of a color filter. The filtering operation can also stack or aggregate multiple images in another manner in order to increase contrast.

After application of the filtering operation (where the filtering operation is optional), the computing system can then apply a centroid algorithm to identify a center position of the reference objects, which in the image shown in FIG. 3A include an array of light providing objects (e.g., MALSR, ALSF-2, retroreflectors, etc.) at the landing site. Alternative embodiments can omit application of a centroid algorithm and alternatively use another feature extraction approach (e.g., speeded up robust feature approach, oriented FAST and rotated BRIEF approach, scale invariant feature transform approach, etc.) locating a reference position of an object within an image. The computing system can also apply a transformation operation to transform the image (or filtered version thereof) from a 3D space to a 2D space, using a homography matrix operation, covariance matrix operation, or another transformation operation. The computing system can then automatically compare and match the centroid and/or extracted features of the transformed image to a database of airport lighting positions, including lighting positions at the landing/takeoff site (e.g., using a random sample consensus operation, using an iterative closest point operation, etc.), or to a database of markings installed at each landing/takeoff site. In more detail, transformations of the images can include scaling operations, perspective skewing operations, rotation operations, and/or any other suitable operations that transform inbound images to a form that maps onto a scale, perspective, rotation, or other format aspect of the images in the databases of airport lighting or marking positions. Matching can then be performed between transformed images that have analogous formats to the image formats in the database of airport lighting positions. Outputs of the transformation and matching processes are then used to generate data associated with coordinates of the locations of the reference objects (e.g., lights, proprietary marking configuration) relative to the aircraft, in order to generate 330*b* an updated analysis of the state of the aircraft in relation to the reference objects, with updated protection levels for localization.

Figure 3B:
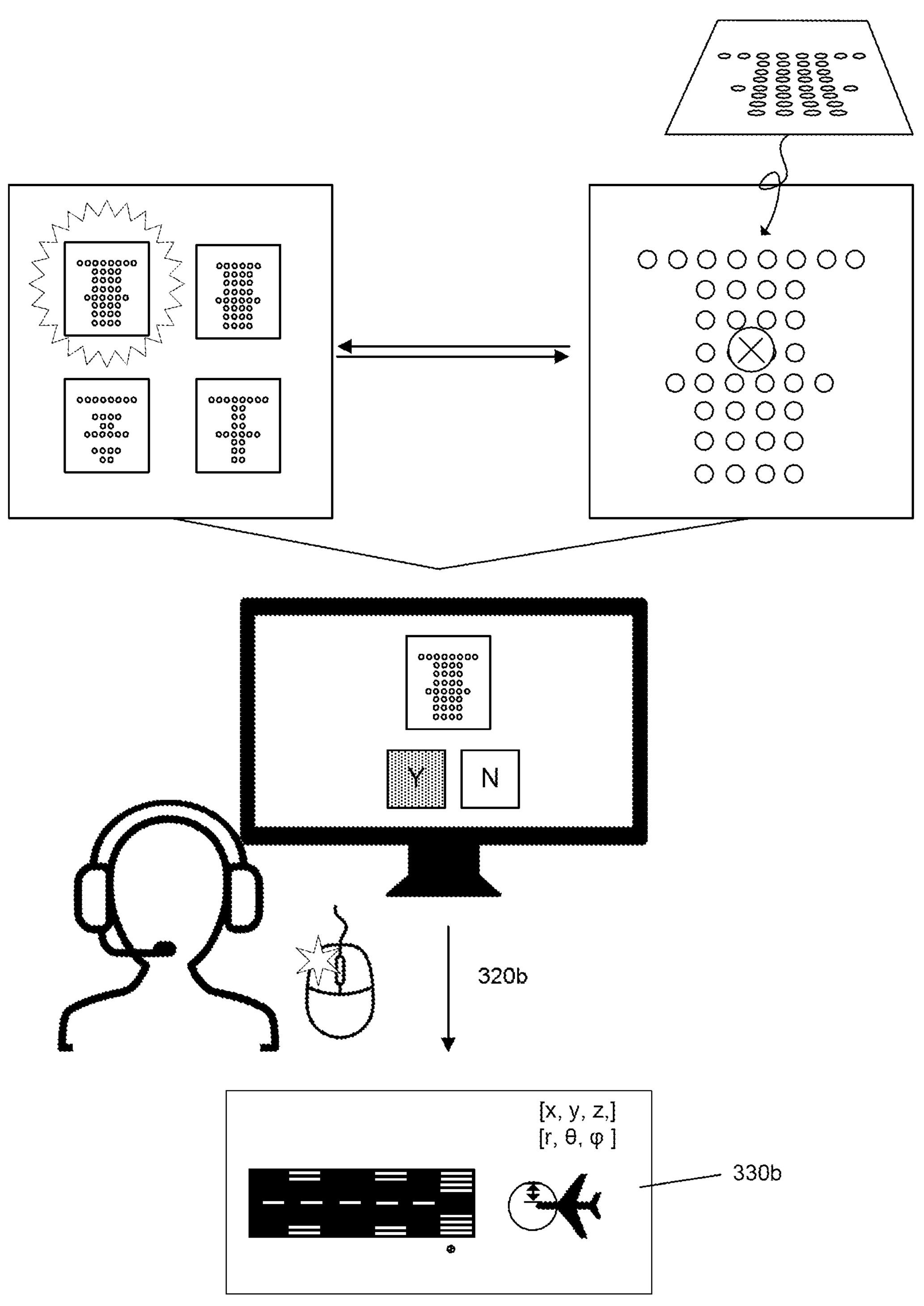
FIG. 3B depicts a schematic of another variation of a portion of the method shown in FIGS. 2A-2B.

FIG. 3B depicts a schematic of another variation of 220*a* and 220*b*, where the images(s) is/are transmitted to a computing entity that automatically applies image processing operations to the image(s), where the image processing operations can be similar to or identical to those performed in relation to FIG. 3A After processing the images, the computing entity can then transmit digital content derived from image processing to an entity at an operator interface. The entity at the operator interface can then verify 320*b* the output of the remote computing entity, and upon verification by interaction with an input device of the operator interface, the computing system can generate 330*b* an updated analysis of the state of the aircraft in relation to the reference objects, with updated protection levels for localization. As such, some variations of the localization cross-check procedure can involve a human entity; however, other variations of the localization cross-check procedure can alternatively omit involvement of a human entity.

2.2.2 Cross-Checking Procedure Based on Active Infrastructure and Markings

In another embodiment, the flight computer 116 or other portion of the computing system (e.g., remote station 120, FMS 150) described above can receive and process signals derived from active infrastructure, such as active ground infrastructure located in proximity to a landing or takeoff site. In this embodiment, the flight computer 116 or other portion of the computing system can verify GPS integrity with tighter protection levels in comparison to current navigation aids (e.g., Wide Area Augmentation System, WAAS) and associated WAAS protection levels, by performing synthetic vision and/or radar-based analyses of information derived from active ground structures.

The active infrastructure can provide signals that are triggered based on presence of the aircraft in proximity to a landing site, takeoff site, or other site and/or signals (e.g., radio signals, etc.) output from subsystems of the aircraft. As such, the active infrastructure can be transitioned between active and idle (or off) states depending upon triggering events associated with the position of the aircraft relative to the landing/takeoff site or other site and/or control by subsystems associated with the aircraft. Additionally or alternatively, subsystems (e.g., transponder subsystems) onboard the aircraft can be tuned to receive broadcasted signals from active infrastructure, where the broadcasted signals inherently carry localization information (e.g., in relation to position and distance) based on features of the signal carried between the infrastructure and the aircraft, or are encoded to carry localization information.

The active infrastructure can provide broadcasted signals that are unique to a particular landing site, takeoff site, or other site, and/or unique to a specific aircraft in flight. The active ground structures can broadcast signals including one or more of: light signals, radio signals, audio signals, and any other suitable signals. Furthermore, in relation to broadcasted signals, the active infrastructure can be configured to modulate broadcasted signals in one or more ways. For instance, in relation to light signals, the active infrastructure can be configured to modulate broadcasted signals in one or more: spatial pattern (e.g., regular pattern, irregular pattern), temporal pattern (e.g., in terms of sequences, pulsing, waves, durations, etc.), intensity, frequency, duration, encoded information, color, and other light features. In relation to radio signals, the active infrastructure can be configured to modulate broadcasted signals in one or more: amplitude, frequency, wavelength, temporal pattern (e.g., in terms of sequences, pulsing, waves, durations, etc.), duration, encoded information, and other radio wave features. In relation to audio signals, the active infrastructure can be configured to modulate broadcasted signals in one or more: spatial pattern (e.g., regular pattern, irregular pattern) by directional output, temporal pattern (e.g., in terms of sequences, pulsing, waves, durations, etc.), intensity, frequency/pitch, duration, encoded information, melody, and other audio features.

Active ground structures can include one or more of: instrument landing system localizer systems, controllable airport lighting (e.g., in relation to lighting systems described above in Section 2.2.1), beacons that emit in the visual light spectrum, beacons that emit in the infrared light spectrum, beacons that emit in the ultraviolet spectrum, radio beacons, solar-powered broadcasting sources (e.g., solar light arrays, solar-powered beacons, etc.), speakers, and other active ground structures.

In relation to active signals provided by the active infrastructure, the active infrastructure can be configured to promote secure signal transmission for localization of a specific aircraft, by providing mechanisms for encoding and decoding signals and/or multi-factor authentication. In more detail, the active infrastructure can be configured to operate with a software platform that generates codes (e.g., authentication codes, cryptographic codes) unique to a specific aircraft (e.g., specific aircraft recognized by the software platform by membership or subscription) and/or phase of operation (e.g., instance of flight, specific itinerary, etc.) of the aircraft. In a specific example, the software platform can be configured to provide cryptographic anti-interference codes to aircraft recognized by the software platform through a subscription service that provides subsystems of the aircraft with access to published keys, where the keys allow the subsystems for localization cross-checking to decode the active signals provided by the active ground infrastructure. In another specific example, the software platform can be configured to provide a unique code (e.g., temporary code) for a first factor of authentication, to aircraft recognized by the software platform, where one or more subsystems of the aircraft are required to provide the unique code back to the software platform within a window of time, in order to receive or be able to decode the active signals provided by the active ground infrastructure.

Furthermore, in relation to active signals detectable by cameras of the camera subsystem 117 described above or other optical sensors, the computing system can process the active signals according to methods described above in relation to FIGS. 3A and 3B in order to generate 330*b* an updated analysis of the state of the aircraft in relation to the reference objects, with updated protection levels for localization. Additionally, or alternatively, in relation to radar-based signals, the computing system can process active signals according to methods described above for processing radar signals (e.g., through use of radar altimeter measurements compared to a pre-populated database).

2.2.3 Cross-Checking Procedure Based on Time-of-Flight Cross Checks and/or Radar Altimeter Data In another embodiment, the flight computer 116 or other portion of the computing system (e.g., remote station 120, FMS 150) described above performs time-of-flight cross checks against signals from transponder grids (e.g., ground-based transponder grids). In this embodiment, the flight computer 116 or other portion of the computing system can verify GPS integrity to a high degree of accuracy in comparison to current navigation aids (e.g., Wide Area Augmentation System, WAAS) and associated WAAS protection levels, by performing time-of-flight cross checking procedures. In more detail, time-of-flight analyses of transmitted and/or received radiofrequency (or other directional signals) can be used by the computing system to extract distance and/or position information (e.g., horizontal position, vertical position) for localization of the aircraft.

In another embodiment, the flight computer 116 or other portion of the computing system (e.g., remote station 120, FMS 150) described above performs cross checks using information from radar altimeter subsystems onboard the aircraft. In this embodiment, the flight computer 116 or other portion of the computing system can verify GPS integrity to a high degree of accuracy in comparison to current navigation aids (e.g., Wide Area Augmentation System, WAAS) and associated WAAS protection levels, by cross-checking radar altimeter data against information from pre-recorded contour maps or other height/altitude databases, in order to generate a localization estimate for the aircraft (e.g., relative to a landing site or takeoff site).

In more detail, time-of-flight analyses of transmitted and/or received radiofrequency (or other directional signals) can be used by the computing system to extract distance and/or position information (e.g., horizontal position, vertical position) for localization of the aircraft.

However, initiating a localization cross-checking procedure can alternatively be implemented in another manner.

2.3 Method-Updating Analysis of Aircraft Status with Updated Protection Levels As shown in FIGS. 2A and 2B, Blocks 230*a* and 230*b* include functionality for generating updated analyses of a state of the aircraft (e.g., in relation to protection levels relative to a desired landing or takeoff site). In particular, in relation to system elements described above, the flight computer 116 or other portion of the computing system (e.g., remote station 120, FMS 150) receives the outputs of Blocks 220*a* and 220*b*, which provide more accurate localization estimates derived from processing signals from one or more passive elements, active elements, and/or time-of-flight analyses. The flight computer 116 or other portion of the computing system then analyzes the localization estimates in comparison with localization information (e.g., WAAS localization protection levels) associated with other aircraft subsystems, and uses the outputs of Blocks 220*a* and 220*b* to verify integrity of the other aircraft subsystems (e.g., in relation to proper working status), and/or to update aircraft localization estimates with reduced error.

In one embodiment of Blocks 230*a* and 230*b*, the flight computer 116 or other portion of the computing system updates a horizontal protection level (HPL) and a vertical protection level (VPL) associated with operation of the aircraft relative to the landing/takeoff site. In specific examples, the outputs of Blocks 230*a* and 230*b* can be used to reduce protection levels from ~10-50 meters provided by standard WAAS systems, to ~1-2 meters, thereby providing significantly greater accuracy.

Figure 4:
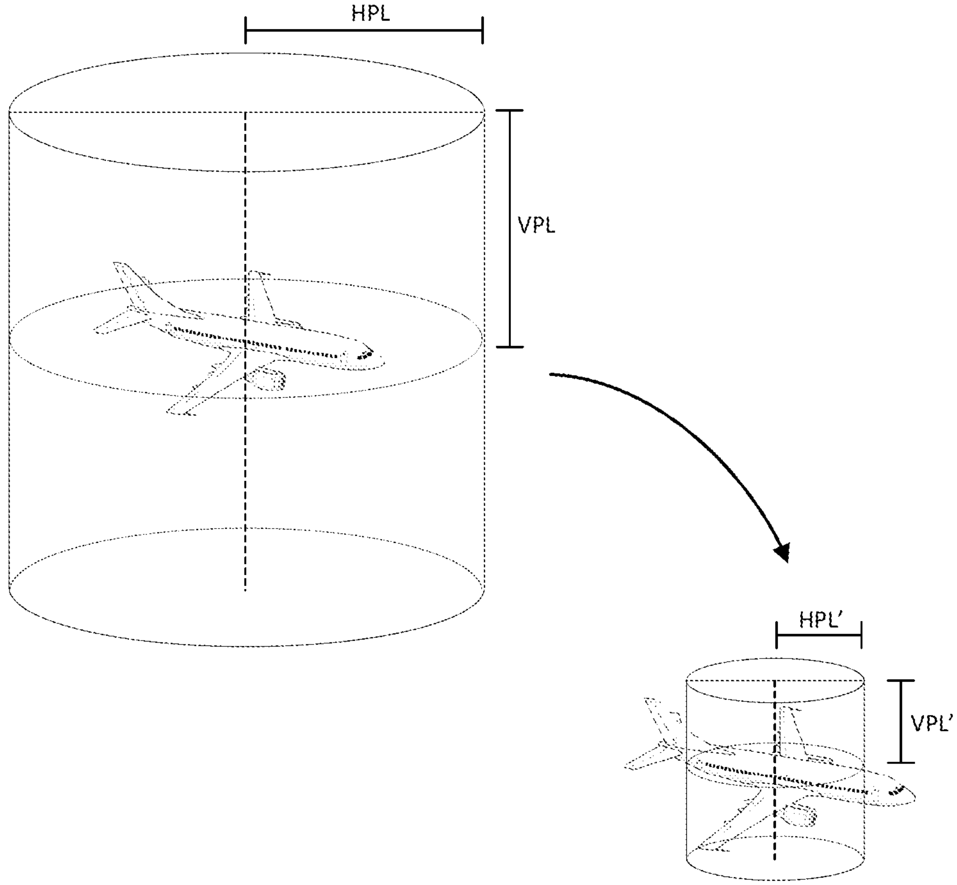
FIG. 4 depicts a schematic of an embodiment of updating protection levels, according to a variation of a portion of the method shown in FIGS. 2A-2B.

In relation to HPL, the flight computer 116 or other portion of the computing system can re-define the HPL based upon outputs of blocks 220*a* and 220*b*, by reducing the area of geometries defining the HPL. For instance, the HPL can be defined by a radius of a circle in the horizontal plane (e.g., the plane tangent to the WGS-84 ellipsoid) with its center being at the estimated position of the aircraft, which describes the region that is assured to contain the true horizontal position of the aircraft. In improving the HPL, the flight computer 116 or other portion of the computing system can reduce the radius of the circle defining the HPL based upon outputs of blocks 220*a* and 220*b*, as shown in FIG. 4.

In relation to VPL, the flight computer 116 or other portion of the computing system can re-define the VPL based upon outputs of blocks 220*a* and 220*b*, by reducing the area of geometries defining the HPL. For instance, the VPL can be defined by half the length of a segment on the vertical axis (perpendicular to the horizontal plane of WGS-84 ellipsoid) with its center being at the estimated position of the aircraft, which describes the region that is assured to contain the true vertical position of the aircraft. In improving the VPL, the flight computer 116 or other portion of the computing system can reduce the length of the segment defining the VPL based upon outputs of blocks 220*a* and 220*b*, as shown in FIG. 4.

In relation to other estimates of error in position of the aircraft, the flight computer 116 or other portion of the computing system can process outputs of blocks 220*a* and 220*b* to improve error estimates (e.g., by reducing error) based on data aggregated from all sources associated with the method. For instance, embodiments of blocks 230*a* and 230*b* can include combining GPS error, error associated with computer vision solutions, and/or error from other sources, for instance, with a weighted combination function of the following form:

$$\text{TOTAL ERROR} = F[w_1 f(E_1), w_2 f(E_2), \ldots w_N f(E_N)],$$

where w is a weight associated with an error source, *f*( ) is a function associated with an error source, and F[ ] represents the aggregated error.

In relation to updating "worst-case" bounds (e.g., protection levels), outputs of the localization cross-check procedure can be used to omit from consideration (or set tighter bounds on/reduce the weight given to) various error sources used to determine GPS protection level calculations (e.g., receiver autonomous integrity monitoring-associated calculations).

2.4 Method—Operational Control

As shown in FIGS. 2A and 2B, Blocks 240*a* and 240*b* include functionality for generating a set of instructions for operational control of the aircraft based upon the updated analysis of the state of the aircraft (e.g., with the FMS 150, etc.) Based on the outputs of blocks 230*a* an 230*b*, the computing system (e.g., a portion of the computing system operating at the remote station, a portion of the computing system operating at a flight computer onboard the aircraft, etc.) generates 240*a*, 240*b* instructions for operational control of the aircraft relative to the landing/takeoff site or other site. The flight computer or other computing components controlling operation of control surfaces receives the instructions and control operational configurations of one or more control surfaces of the aircraft to maintain or redirect flight of the aircraft toward the landing/takeoff site. As such, blocks 240*a* and 240*b* include functionality for controlling operation of the aircraft toward a desired path upon transmitting the set of instructions to a flight computer of the aircraft and manipulating one or more control surfaces of the aircraft based on the set of instructions.

In Blocks 240*a* and 240*b*, the computing system (e.g., the flight computer) can use generated instructions to control configuration states of one or more of: ailerons of the aircraft (e.g., to affect flight about a roll axis), flaps of the aircraft (e.g., to affect rate of descent), elevators of the aircraft (e.g., to control flight about a pitch axis), rudders of the aircraft (e.g., to control flight about a yaw axis), spoilers of the aircraft (e.g., to control lift of the aircraft), slats of the aircraft (e.g., to control angle of attack of the aircraft), air brakes (e.g., to control drag of the aircraft), trim surfaces (e.g., to control trim of the aircraft relative to any axis and/or reduce system mechanical load), and any other suitable control surfaces of the aircraft.

In Blocks 240*a* and 240*b*, the computing system (e.g., the flight computer) can also use generated instructions to control configuration states of power plant components including one or more of: manifold pressure, revolutions (e.g., revolutions per minute), fuel mixture, electrical output from a battery, cooling system operational states (e.g., in relation to cowl flaps, in relation to liquid cooling systems, in relation to fins, etc. . . . ) for aircraft performance toward the landing site.

In Blocks 240*a* and 240*b*, the computing system (e.g., the flight computer) can also use generated instructions to control other aircraft system aspects. For instance, the generated instructions can be used to control communications with air traffic control at the landing site, in relation to automated reception and/or read back of instructions from air traffic control.

In relation to operational control of the aircraft, the computing system generates instructions that account for aircraft orientation due to environmental effects and landing/takeoff procedures due to environmental effects. For instance, the computing system can generate instructions upon detecting crosswinds and computing a crosswind control factor for the ailerons and rudders of the aircraft. In another example, computing system can generate instructions for a flight path to a preferred runway due to prevailing winds at the landing site (e.g., to avoid landing with a significant tail wind). In another example, the computing system can generate instructions for power plant settings in relation to winds at the landing site.

In relation to operational control of the aircraft, the computing system can also generate instructions that account for landing/takeoff site features and/or geographical features about the landing/takeoff site. For instance, the computing system can generate instructions for producing a steeper or flatter approach (e.g., with slipped configuration settings, with flap settings, with landing gear settings, etc.) based on runway features (e.g., length, position relative to geography, position relative to obstacles along the approach path, etc.). In another example, the computing system can generate instructions for control surface settings and/or power plant settings based on runway features, such as uphill grade, downhill grade, roughness, wetness, type (e.g., grass, dirt, water, snow, etc.), width, and/or any other suitable landing site feature. In another example, the computing system can generate instructions for control of the aircraft and/or verification of appropriate pose relative to a desired runway, which can be beneficial if there are multiple parallel runways and/or taxiways about the desired runway for landing.

However, the computing system can generate instructions used by the flight computer to control aircraft operation for other aircraft aspects, other environmental aspects, and/or other landing site aspects.

2.5 Method—Additional Blocks and Applications

Figure 5:
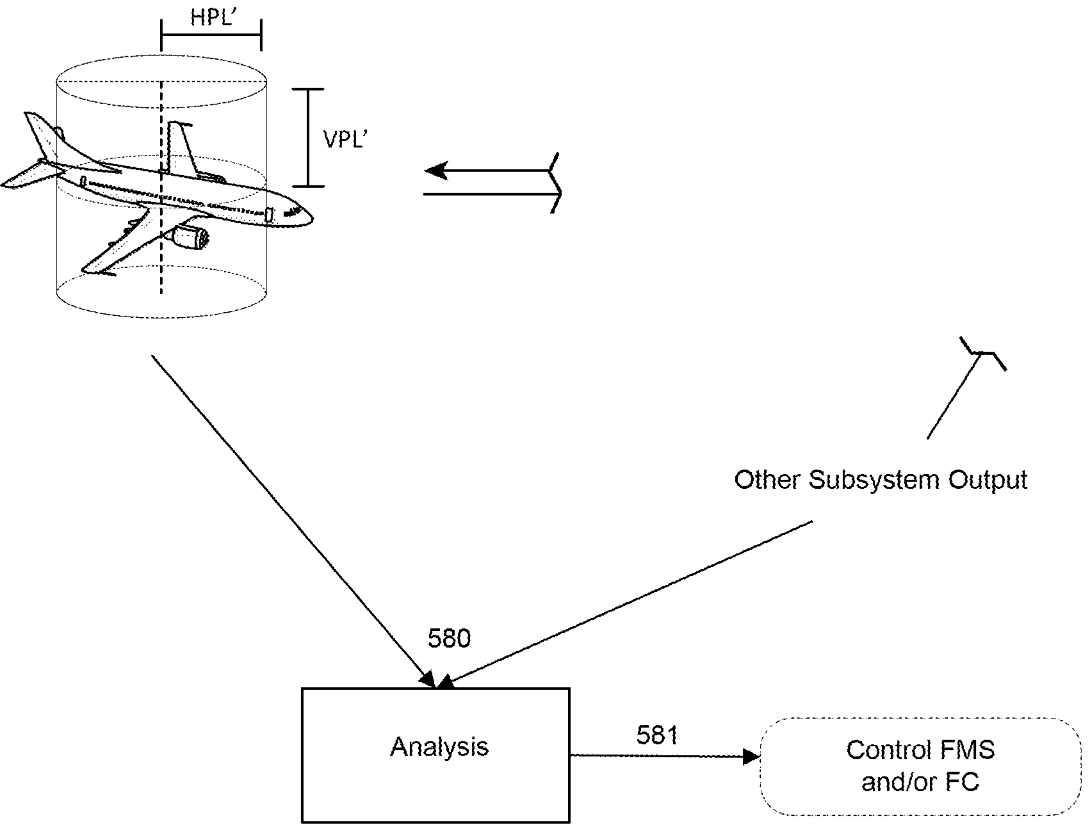
FIG. 5 depicts a method for performing a system check, in accordance with one or more embodiments.
Figure 5:
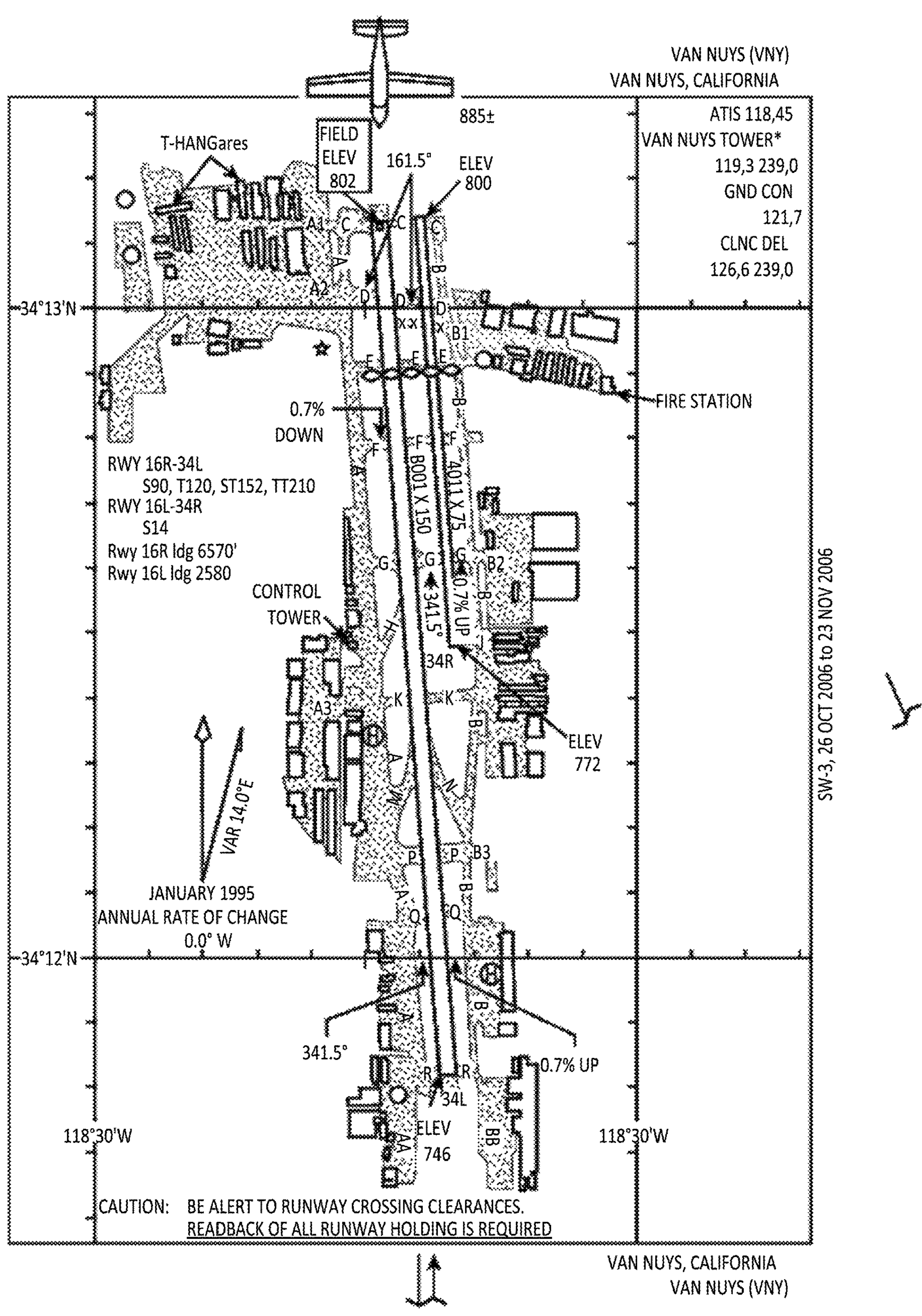

The method can optionally include functionality for using an image-estimated pose, pose trajectory, or other method output to perform a system check. FIG. 5 depicts a method for performing a system check, in accordance with one or more embodiments. As such, the computing system (e.g., portion at a remote station, portion onboard the aircraft) can generate 580 a system check output from the localization estimate/other analysis, and an output of another navigation system of the aircraft (e.g., a GPS), to evaluate performance of the other navigation system. For instance, the computing system can compare a localization estimate with a given time stamp determined according to the method(s) described above to a position of the aircraft determined from another subsystem at the given time stamp. The comparison can be used to determine if the image-derived position is significantly different.

Then, based on the comparison, the computing system can generate 581 instructions for control of the flight management system and/or flight computer of the aircraft, in relation to reliance upon the GPS or other navigation, in relation to aircraft control, and/or for any other suitable purpose. Aircraft control instructions can include various instructions described in Section 2.5 above, or any other suitable instructions. Navigation system control instructions can include instructions for rebooting a navigation system, transitioning a navigation system to a deactivated or idle state, preventing a navigation system from controlling other aircraft subsystems (e.g., an autopilot system), and/or any other suitable navigation system control instructions.

Additionally, or alternatively, the method and associated system components can include functionality for supporting a pilot operating the aircraft. For instance, the method and/or system can operate in a co-pilot operation mode where any generated analyses of pose, analyses of pose trajectory, and/or instructions are transformed into notifications to the pilot (e.g., at a display, through an audio output device, etc.) in relation to suggestions for control of the aircraft. Notifications can include a notification to abort landing (if landing is deemed to be unsafe), a notification that indicates that the approach to the landing site is appropriate, a notification related to changes to course of the aircraft (e.g., relative to the landing site), a notification related to configuration of the aircraft in relation to approach to the landing site, and/or any other suitable notification. The method(s) described can, however, include any other suitable steps or functionality for determining aircraft poses while the aircraft is in flight, controlling flight operation of the aircraft (e.g., toward a landing site), and/or evaluating performance of subsystems of the aircraft based on computed pose information.

3. Conclusion

The system and methods described can confer benefits and/or technological improvements, several of which are described herein. For example, the system and method employ non-traditional use of sensors (e.g., image sensors, IMUs, etc.) to determine poses of an aircraft while the aircraft is in flight toward a landing site. Landing an aircraft, in particular, requires dynamic monitoring and control of aircraft operational states, and the method and system employ sensors in a novel manner for control of flight of aircraft (e.g., fixed wing aircraft, other aircraft) in relation to landing.

The system and method also include functionality for evaluating performance of other subsystems of the aircraft (e.g., image capture subsystems, navigation systems, etc.) to improve their performance or otherwise improve safety of a flight operation.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, one implementation of which is set forth in the following claims.

What is claimed is:

1. A computer-implemented method, comprising:

determining position data of an aircraft in relation to a landing site, the position data of the aircraft determined by a navigation-related subsystem on the aircraft;

receiving, from a camera subsystem of the aircraft, image data of a reference object of the landing site;

estimating a position of the aircraft in relation to the landing site based on the image data;

cross-checking, by the navigation-related subsystem of the aircraft, the position data of the aircraft determined by the navigation-related subsystem with the estimated position of the aircraft that was estimated based on the image data received from the camera subsystem of the aircraft to determine a position error associated with the aircraft;

updating, by the navigation-related subsystem on the aircraft, one or more protection levels of the aircraft including at least one of a horizontal protection level of the aircraft and a vertical protection level of the aircraft based on the position error of the aircraft determined by the navigation-related subsystem of the aircraft and the estimated position of the aircraft that was estimated based on the image data of the reference object of the landing site, wherein the horizontal protection level is a radius of a circle in a horizontal plane with the aircraft being at a center of the circle and the vertical protection level is a half-length of a segment on a vertical axis that is different from the horizontal plane with the aircraft being at a center of the vertical axis, wherein the horizontal protection level and vertical protection level are greater for a first position error than for a second position error that is less than the first position error; and generating an updated set of instructions for operational control of the aircraft based on the updated one or more protection levels.

2. The computer-implemented method of claim 1, wherein the reference object is a passive ground structure including one of an approach lighting system of the landing site, a runway lighting system of the landing site, lights associated with a clearance of the landing site, lights associated with air traffic control of the landing site, a passive beacon, or lights of an airport corresponding to the landing site.

3. The computer-implemented method of claim 1, wherein the reference object is a passive ground structure including one of runway markers of the landing site, taxiway markings, or signage of an airport corresponding to the landing site.

4. The computer-implemented method of claim 1, wherein estimating the position of the aircraft comprises:

extracting features of the reference object in the image data;

comparing the extracted features of the reference object to features of reference objects stored in a database of reference objects;

identifying a reference object in the database of reference objects having features that match the extracted features of the reference object in the image data based on the comparison, the database including position data of the identified reference object; and determining coordinates of the reference object in relation to the aircraft based on the position data of the identified reference object.

5. The computer-implemented method of claim 4, wherein the extracted features of the reference object include a centroid of the reference object.

6. The computer-implemented method of claim 4, further comprising:

applying a filtering operation to the image data that increases an intensity of features of the reference object, wherein the features of the reference object are extracted responsive to applying the filtering operation to the image data.

7. The computer-implemented method of claim 4, further comprising:

transforming the image data from a three-dimensional space to a two-dimensional space, wherein the features of the reference object are extracted responsive to the transformation.

8. The computer-implemented method of claim 1, further comprising:

determining, by the navigation-related subsystem of the aircraft, that a condition is met, wherein the image data is received from the camera subsystem of the aircraft responsive to the determination.

9. The computer-implemented method of claim 8, wherein the condition comprises an altitude of the aircraft matching an altitude threshold or a position of the aircraft matching a reference position.

10. The computer-implemented method of claim 1, wherein the horizontal protection level is a radius of a circle in a horizontal plane with the aircraft being at a center of the circle and the vertical protection level is the radius of the circle in a vertical plane.

11. The computer-implemented method of claim 1, wherein the updated set of instructions control the aircraft toward a flight path to the landing site.

12. A system, comprising:

a processor; and a non-transitory computer-readable storage medium storing computer program instructions executable by the processor to perform operations, the operations comprising:

determining position data of an aircraft in relation to a landing site, the position data of the aircraft determined by a navigation-related subsystem on the aircraft;

receiving, from a camera subsystem of the aircraft, image data of a reference object of the landing site;

estimating a position of the aircraft in relation to the landing site based on the image data;

cross-checking, by the navigation-related subsystem of the aircraft, the position data of the aircraft determined by the navigation-related subsystem with the estimated position of the aircraft that was estimated based on the image data received from the camera subsystem of the aircraft to determine a position error associated with the aircraft;

updating, by the navigation-related subsystem on the aircraft, one or more protection levels of the aircraft including at least one of a horizontal protection level of the aircraft and a vertical protection level of the aircraft based on the position error of the aircraft determined by the navigation-related subsystem of the aircraft and the estimated position of the aircraft that was estimated based on the image data of the reference object of the landing site, wherein the horizontal protection level is a radius of a circle in a horizontal plane with the aircraft being at a center of the circle and the vertical protection level is a half-length of a segment on a vertical axis that is different from the horizontal plane with the aircraft being at a center of the vertical axis, wherein the horizontal protection level and vertical protection distances are greater for a first position error than for a second position error that is less than the first position error; and generating an updated set of instructions for operational control of the aircraft based on the updated one or more protection levels.

13. The system of claim 12, wherein the reference object is a passive ground structure including one of an approach lighting system of the landing site, a runway lighting system of the landing site, lights associated with a clearance of the landing site, lights associated with air traffic control of the landing site, a passive beacon, or lights of an airport corresponding to the landing site.

14. The system of claim 12, wherein the reference object is a passive ground structure including one of runway markers of the landing site, taxiway markings, or signage of an airport corresponding to the landing site.

15. The system of claim 12, wherein estimating the position of the aircraft comprises:

extracting features of the reference object in the image data;

comparing the extracted features of the reference object to features of reference objects stored in a database of reference objects;

identifying a reference object in the database of reference objects having features that match the extracted features of the reference object in the image data based on the comparison, the database including position data of the identified reference object; and determining coordinates of the reference object in relation to the aircraft based on the position data of the identified reference object.

16. The system of claim 12, wherein the extracted features of the reference object include a centroid of the reference object.

17. The system of claim 15, wherein the processor is configured to perform further operations comprising:

applying a filtering operation to the image data that increases an intensity of features of the reference object, wherein the features of the reference object are extracted responsive to applying the filtering operation to the image data.

18. The system of claim 15, wherein the processor is configured to perform further operations comprising:

transforming the image data from a three-dimensional space to a two-dimensional space, wherein the features of the reference object are extracted responsive to the transformation.

19. The system of claim 12, wherein the processor is configured to perform further operations comprising:

determining, by the navigation-related subsystem of the aircraft, that a condition is met, wherein the image data is received from the camera subsystem of the aircraft responsive to the determination.

20. The system of claim 12, wherein the horizontal protection level is a radius of a circle in a horizontal plane with the aircraft being at a center of the circle and the vertical protection level is the radius of the circle in a vertical plane.

* * * * *